Figure 1:
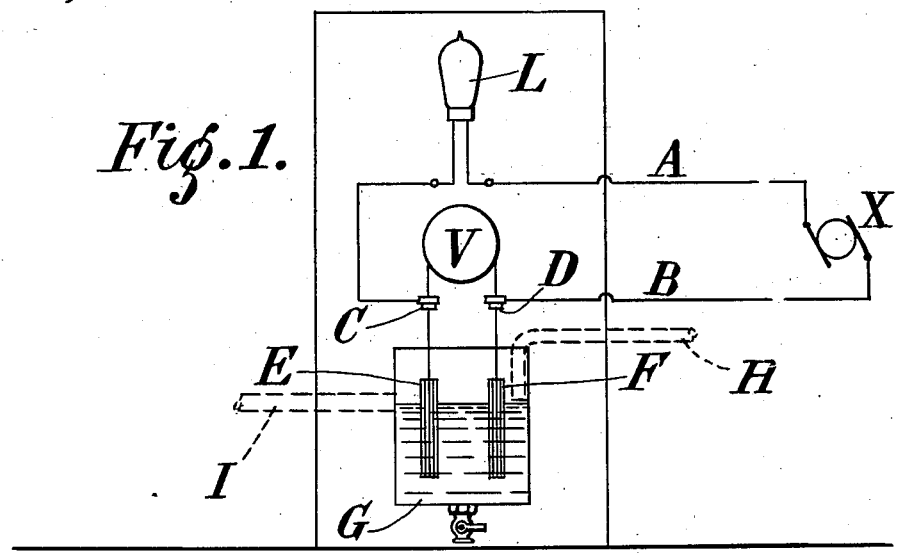

W. C. CROCKATT.
MEANS FOR ELECTRICALLY INDICATING THE PRESENCE OF SALINE, ALKALINE, OR ACID IMPURITIES IN LIQUIDS.
APPLICATION FILED FEB. 21, 1917.

1,320,036.

Patented Oct. 28, 1919.

INVENTOR
William Campbell Crockatt
BY Diederhein + Fairbanks
ATTORNEYS.

UNITED STATES PATENT OFFICE.

WILLIAM CAMPBELL CROCKATT, OF GLASGOW, SCOTLAND.

MEANS FOR ELECTRICALLY INDICATING THE PRESENCE OF SALINE, ALKALINE, OR ACID IMPURITIES IN LIQUIDS.

1,320,036.

Specification of Letters Patent.

Patented Oct. 28, 1919.

Application filed February 21, 1917. Serial No. 150,049.

*To all whom it may concern:*

Be it known that I, WILLIAM CAMPBELL CROCKATT, a subject of the King of Great Britain, residing at Glasgow, Scotland, have invented certain new and useful Means for Electrically Indicating the Presence of Saline, Alkaline, or Acid Impurities in Liquids, of which the following is a specification.

This invention relates to electrically indicating or detecting the presence of saline, alkaline, or acid impurities in feed water used for steam generators and for other purposes and it is based on the well known principle that the presence of such impurities reduces the electrical resistance of the water containing them.

A method of detecting the presence of impurities in liquid, by the measurement of the electrical resistance of the liquid under test, has already been proposed, but the object of the present invention is to indicate the presence of impurities by a more direct method, the apparatus devised for this purpose being such that it can be used in connection with any source of electric current, either direct or alternating, provided that the voltage of the circuit is sufficient to overcome the back E. M. F. of the electrolytic cell constituted by the liquid under test and thus to cause a current to pass through the liquid.

The invention, briefly, consists in passing a direct or alternating electric current through the liquid containing the impurities, which acts as an electric conductor, and arranging in series with the liquid an incandescent lamp, or other indicating means of comparatively high resistance, whereby the presence of the impurities is indicated by the variation of the electrical resistance of the liquid. That is to say, when the liquid is pure there will be a high electrical resistance, but when the liquid becomes impure, saline, for instance, the resistance is lowered and the variations in the flow of the current will be indicated.

According to the present invention I arrange a circuit comprising a vessel of glass, or other suitable material, containing the liquid and having two electrodes made of carbon or other conducting material, a source of electrical energy of approximately constant voltage, and an incandescent electric lamp or other resistance, arranged in series with the liquid.

In order that my said invention may be properly understood I have hereunto appended an explanatory drawing whereon two forms of the invention are shown diagrammatically by way of illustration or example.

In the form of the invention illustrated at Figure 1 an apparatus for testing water or other liquids is illustrated, A and B being the leads from the source of electrical energy X. The leads A, B, are connected to the terminals C, D, and these terminals are connected to two electrodes E, F, which are immersed in the liquid to be tested, said liquid being contained in the vessel G and constituting an electrolytic cell. L is an electric incandescent lamp connected in series with the electrolytic cell G, and V is a voltmeter connected to the terminals C, D, of the cell. The electrical energy may be derived from a battery, an accumulator, or from a lighting or power circuit X, or from any suitable source, where the voltage remains constant, within the usual limits.

When an electric incandescent lamp L, as illustrated at Fig. 1, is used as the resistance, it is preferably rated at, or slightly less than, the voltage of the source of electrical energy, that is to say, it lights brightly at that voltage. So long as the liquid remains pure, or nearly so, the resistance is high and therefore the electric current passing through same will be small and the lamp will not show any appreciable light. If any impurity, in the form of saline, alkaline, or acid matter, enters the liquid the resistance is immediately lowered and the current passing through the lamp L increases. The filament of the lamp immediately commences to glow and its brightness increases as the quantity of the impurities in the liquid increases owing to such impurities lowering the resistance.

If desired, a voltmeter V may be connected across the terminals C, D, of the electrodes E, F, in addition to the lamp or other resistance, and so long as the liquid is pure and therefore the resistance high, the voltmeter V will read only a little below the voltage of the source of electrical energy, but as the percentage of impurity increases and the resistance decreases, with a corresponding increase in the current, the reading on the voltmeter will fall and thus give an additional indication of the presence of the impurity.

Instead of taking separate samples of the liquid and testing them, from time to time, the apparatus, for example, may be so arranged that a constant stream of the liquid to be tested flows into the vessel G, a suitable overflow being provided. As indicated in dotted lines at Fig. 1, H is a supply pipe for continuously supplying the liquid to be tested, to the vessel G, and I is an overflow pipe for carrying off the surplus liquid. As the liquid flows through the vessel G the degree of brightness of the lamp L, at any instant, will give an indication of the degree of purity of the liquid.

Figure 2:
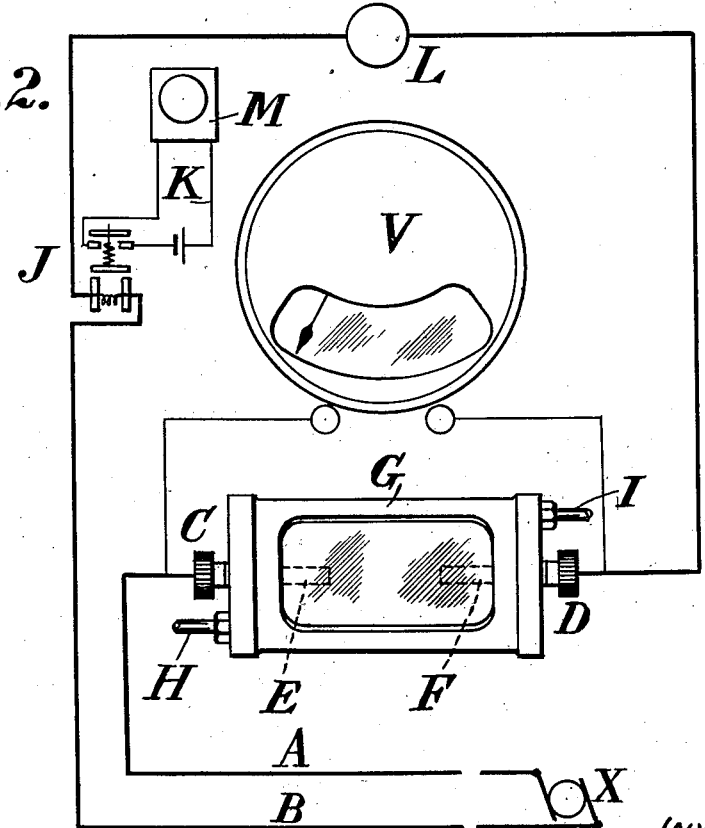

In the arrangement illustrated at Fig. 2, in addition to the electric incandescent lamp L, the current conducted from the source of electrical energy X through the leads A, B, is so arranged that it actuates a relay J or its equivalent when it exceeds a predetermined value, and thereby closes a circuit K so as to operate an electric bell M, or other suitable indicating means.

If desired, the arrangement illustrated at Fig. 2 may be modified by dispensing with the lamp L. In this case the resistance of the relay J would be made to correspond approximately to that of the lamp L.

Having now fully described my invention what I claim and desire to secure by Letters Patent is:—

1. Means for electrically indicating the presence of saline, alkaline, or acid impurities in a liquid, comprising in combination, a source of electrical energy, an electric circuit, a vessel containing liquid and having electrodes, included in the circuit, means for continuously supplying liquid to and discharging liquid from the vessel, electrical indicating means arranged in series with the liquid, a second source of electrical energy, a second electric circuit, means included in the first circuit for closing said second electric circuit when the current passing through the vessel exceeds a predetermined value and indicating means included in the second circuit and operated by the closing of said second circuit.

2. Means for electrically indicating the presence of saline, alkaline, or acid impurities in a liquid, comprising in combination, a source of electrical energy, an electric circuit, a vessel containing liquid and having electrodes, included in the circuit, means for continuously supplying liquid to and discharging liquid from the vessel, a voltmeter included in the circuit and visual electrical indicating means arranged in series with the liquid, a second source of electrical energy, a second electric circuit, means included in the first circuit for closing said second electric circuit when the current passing through the vessel exceeds a predetermined value, and indicating means included in the second circuit and operated by the closing of said second circuit.

3. Means for electrically indicating the presence of saline, alkaline, or acid impurities in a liquid, comprising in combination, a source of electrical energy, an electric circuit, a vessel containing liquid and having electrodes, included in the circuit, means for continuously supplying liquid to and discharging liquid from the vessel, a voltmeter included in the circuit, visual and audible electrical indicating means arranged in series with the liquid, a second source of electrical energy, a second electric circuit, means included in the first circuit for closing said second electric circuit when the current passing through the vessel exceeds a predetermined value and indicating means included in the second circuit and operated by the closing of said second circuit.

4. Means for electrically indicating the presence of saline, alkaline, or acid impurities in a liquid, comprising in combination, a source of electrical energy, an electric circuit, a vessel containing liquid and having electrodes, included in the circuit, means for continuously supplying liquid to and discharging liquid from the vessel, voltmeter included in the circuit and visual and audible electrical indicating means arranged in series with the liquid, a second source of electrical energy, a second electrical circuit, a relay included in the first circuit for closing said second electric circuit when the current passing through the vessel exceeds a predetermined value and audible indicating means included in the second circuit and operated by the closing of said second circuit.

In testimony whereof I affix my signature in presence of two witnesses.

WILLIAM CAMPBELL CROCKATT.

Witnesses:
WILLIAM FLEMING,
KATE WALKER.